(12) United States Patent
Penev

(10) Patent No.: US 8,646,550 B2
(45) Date of Patent: Feb. 11, 2014

(54) SELF RECHARGEABLE SYNERGY DRIVE FOR A MOTOR VEHICLE

(76) Inventor: Krassimire Mihaylov Penev, Stamford, CT (US)

( * ) Notice: Subject to any disclaimer, the term of this patent is extended or adjusted under 35 U.S.C. 154(b) by 0 days.

(21) Appl. No.: 13/476,192

(22) Filed: May 21, 2012

(65) Prior Publication Data
US 2013/0306389 A1 Nov. 21, 2013

(51) Int. Cl.
*B60K 16/00* (2006.01)

(52) U.S. Cl.
USPC .......... 180/2.2; 180/165; 180/2.1; 180/65.31; 188/161; 188/162; 188/164; 188/266; 188/267

(58) Field of Classification Search
USPC ......... 180/165, 2.1, 2.2, 65.31; 188/161, 162, 188/164, 166, 266, 267; 301/6.3
See application file for complete search history.

(56) References Cited

U.S. PATENT DOCUMENTS

| | | | |
|---|---|---|---|
| 1,671,033 A | 5/1928 | Kimura | |
| 3,168,348 A * | 2/1965 | Fleming et al. | 301/6.3 |
| 3,556,239 A * | 1/1971 | Spahn | 180/65.25 |
| 3,688,859 A | 9/1972 | Huspeth | |
| 4,168,759 A * | 9/1979 | Hull et al. | 180/2.2 |
| 4,182,960 A | 1/1980 | Reuyl | |
| 4,254,843 A * | 3/1981 | Han et al. | 180/165 |
| 5,725,062 A | 3/1998 | Fronek | |
| 6,138,781 A | 10/2000 | Hakala | |
| 6,857,492 B1 * | 2/2005 | Liskey et al. | 180/165 |
| 7,226,018 B2 * | 6/2007 | Sullivan | 244/111 |
| 7,398,841 B2 * | 7/2008 | Kaufman | 180/2.2 |
| 7,665,553 B2 * | 2/2010 | Tabe | 180/2.2 |
| 7,665,554 B1 * | 2/2010 | Walsh | 180/2.2 |
| 7,854,278 B2 | 12/2010 | Kaufman | |
| 8,434,574 B1 * | 5/2013 | York et al. | 180/2.2 |
| 2003/0116391 A1 * | 6/2003 | Desta et al. | 188/267 |
| 2003/0189380 A1 * | 10/2003 | Ishikawa et al. | 310/77 |
| 2004/0108769 A1 * | 6/2004 | Marathe | 303/2 |
| 2005/0162012 A1 * | 7/2005 | Sakai et al. | 303/191 |
| 2007/0295568 A1 | 12/2007 | Vasilescu | |
| 2008/0035440 A1 * | 2/2008 | Hoeller | 188/296 |
| 2008/0041643 A1 * | 2/2008 | Khalife | 180/2.2 |
| 2008/0179114 A1 * | 7/2008 | Chen | 180/2.2 |
| 2009/0219050 A1 * | 9/2009 | Dessirier et al. | 324/772 |
| 2010/0006351 A1 * | 1/2010 | Howard | 180/2.2 |

(Continued)

FOREIGN PATENT DOCUMENTS

| | | |
|---|---|---|
| EP | 0331559 A | 9/1989 |
| EP | 1747910 A2 * | 1/2007 |
| FR | 2577357 A | 8/1986 |
| WO | WO 2011004921 A1 * | 1/2011 |

OTHER PUBLICATIONS

Raw Machine Translation of WO 2011/004921 A1.*

*Primary Examiner* — J. Allen Shriver, II
*Assistant Examiner* — Steve Clemmons
(74) *Attorney, Agent, or Firm* — Hess Patent Law Firm LLC; Robert J. Hess

(57) ABSTRACT

Vehicle wheels may be equipped with a stator and rotor to induce current to generate electricity as the vehicle wheels rotate or to slow down the vehicle wheels in response to the application of a brake of the vehicle. Air may be sucked through the vehicle wheels through mesh screens to create air flow that passes through ductwork to reach a turbine generator, which generates electricity in response to blade rotation from air flow. A roof mounted solar energy conversion system may generate electricity. A vehicle power supply boosts its energy from all the electricity generated.

14 Claims, 5 Drawing Sheets

(56) References Cited

U.S. PATENT DOCUMENTS

| | | | |
|---|---|---|---|
| 2010/0225282 A1* | 9/2010 | Paasch | 320/152 |
| 2011/0226569 A1* | 9/2011 | Devlieg | 188/158 |
| 2011/0266075 A1* | 11/2011 | Guzelimian | 180/2.2 |
| 2012/0085587 A1* | 4/2012 | Drouin | 180/2.2 |
| 2012/0265381 A1* | 10/2012 | Lee | 701/22 |
| 2013/0015026 A1* | 1/2013 | Li et al. | 188/267 |

* cited by examiner

SELF RECHARGEABLE SYNERGY DRIVE FOR A MOTOR VEHICLE

BACKGROUND OF THE INVENTION

1. Field of the Invention

The present invention relates to boosting an amount of electrical energy available for a motor vehicle from recovered energy sources, including motor vehicle kinetic energy, wind flow, and solar radiation, and providing frictionless braking powered from the recovered energy sources.

2. Discussion of Related Art a. Vehicle Energy Source Recoveries

U.S. Pat. No. 7,854,278 to Kaufman (2010) describes an energy conversion apparatus using recovered energy sources including motor vehicle kinetic energy and wind resistance, supplemented by liquefied air transferred to the vehicle and by solar radiation thereto. The energy sources are combined, as available, to drive a compressor for supplying intake working fluid of a motor vehicle prime mover. Increased fuel mileage and range in conjunction with low grade fuels has long been a goal of automotive design, to make driving more economical, to conserve fossil fuels, and to reduce emission of combustion products. Recovery and combining of vehicle energy sources is available, including kinetic (deceleration and shock), wind resistance, and solar radiation. Recovery of only the deceleration component of kinetic energy, coordinated with electrical transfer between batteries and generators, is used in lightweight hybrid vehicles to provide limited performance improvement. U.S. Pat. No. 7,854,278 describes patents including the following five.

U.S. Pat. No. 1,671,033 to Kimura (1928) describes a transmission with an electric generator and battery storage for recovery of vehicle deceleration, the component of vehicle kinetic energy in the direction of travel. The recovered energy, normally dissipated by engine compression and vehicle braking, is stored in batteries and used for limited electrical power assist. Deceleration energy is not completely recoverable due in part to insufficient battery capacity.

U.S. Pat. No. 3,688,859 to Hudspeth and Lunsford (1972) describes compressors connected between the frame and axles of a vehicle for recovery of shock, the upward component of vehicle kinetic energy. The recovered energy, normally dissipated by shock absorbers, is used for limited pneumatic power assist. Shock energy is not completely recoverable due to compression heating.

U.S. Pat. No. 6,138,781 to Hakala (2000) describes an electric generator for recovery of vehicle wind energy. The recovered energy, normally dissipated by vehicle drag force, is used for limited electrical power assist. Potential wind energy recovery is not realized because air from a wind recovery device is discharged to relatively high wake pressure. In addition, aerodynamic vehicle shapes are often used to reduce drag loss at the expense of vehicle function, such as carrying capacity.

U.S. Pat. No. 5,725,062 to Fronek (1998) describes the use of a solar photo-voltaic panel atop a vehicle for recovery of solar energy radiating to a vehicle. The recovered energy, normally dissipated to the atmosphere, is used for limited electrical power assist. Solar radiation to a vehicle is not completely recoverable due in part to insufficient battery capacity.

U.S. Pat. No. 4,182,960 to Reuyl (1980) describes transfer of electrical energy between vehicles and stationary sites. Solar energy recovered at a site is stored in batteries to provide power to the site and a portion is transferred to, and stored in batteries in a hybrid gas turbine-electric vehicle. The gas turbine can provide power to the site via an electric generator to supplement site solar energy. Battery storage problems include space and weight limitation, trade-off between battery life and energy discharged, replacement handling, charge time, and ventilation.

b. Electric Retarders

Electric retarders are known. The electric retarder uses electromagnetic induction to provide a retardation force. An electric retardation unit can be placed on an axle, transmission, or driveline and consists of a rotor attached to the axle, transmission, or driveline—and a stator securely attached to the vehicle chassis. There are no contact surfaces between the rotor and stator, and no working fluid. When retardation is required, the electrical windings in the stator receive power from the vehicle battery, producing a magnetic field for the rotor to move in. This induces eddy currents in the rotor, which produces an opposing magnetic field to the stator. The opposing magnetic fields slows the rotor, and hence the axle, transmission or driveshaft to which it is attached. The rotor incorporates internal vains (like a ventilated brake disk) to provide its own air cooling, so no load is placed on the vehicle's engine cooling system. The operation of the system is extremely quiet.

A hybrid vehicle drivetrain uses electrical retardation to assist the mechanical brakes, while recycling the energy. The electric traction motor acts as a generator to charge the battery. The power stored in the battery is available to help the vehicle accelerate.

An eddy current brake, like a conventional friction brake, is responsible for slowing an object, such as a train or a roller coaster. However, unlike electro-mechanical brakes, which apply mechanical pressure on two separate objects, eddy current brakes slow an object by creating eddy currents through electromagnetic induction which create resistance, and in turn either heat or electricity.

The eddy-current brake has its origins in France, where it is sometimes known as the Frein linéaire à courants de Foucault. This commemorates Frenchman Jean Bernard Léon Foucault who discovered the underlying scientific principle in the 19th century. Foucault observed that a higher force was needed to make a vertical copper disc rotate between two magnetic poles, and at the same time the copper disc warmed up. In simple physics, the movement of a metal plate in a magnetic field induces a voltage, which in turn creates eddy currents. Thus a second magnetic field is generated in opposition to the first, and the metal plate decelerates, transforming its kinetic energy into heat. The better the conductivity and permeability of the plate, the stronger the braking force.

The eddy current brake concept is applied in many different fields, such as rowing machines, motor test stands, roller coasters or free-fall tower rides in amusement parks. These are generally fitted with permanent magnets, which are used as a service brake and can generate a force of up to 1 000 kN.

There is no mechanical contact between the brake and track for a train railway using the eddy current brake, as the magnetic field operates across an air gap between train and rail. Thus it is wear-free and silent, requiring minimal maintenance. The braking force is independent of the coefficient of friction, ensuring high efficiency regardless of wheel-rail adhesion, for example in damp conditions or on wet leaves. This means that relatively high braking forces can be applied, which remain almost constant, even in high-speed applications. The braking force can be accurately controlled by regulation of the magnetic field. Kinetic energy from the train is absorbed by the rail and converted into heat.

Eddy currents are induced by movement in a magnetic field, which means that eddy-current braking conventionally cannot be used as a parking brake. Retardation is dependent on speed—the faster the train, the greater the braking force, subject only to the intensity of the magnetic field. This allows the brake to be finely controlled, as the magnetic field is created using electro-magnets fed from an exter-nal power supply (FIG. 1). The braking force of the eddy-current brakes fitted to the ICE3s is around 21 kN per unit, giving a total of 170 kN for a trainset with eight brakes running at 200 km/h.

A Telma retarder is frictionless electromagnetic braking system made by Telma, a company that is part of the Valeo group, a French automotive components manufacturer. A Telma retarder is an eddy current brake system.

The system works by energizing coils with alternating polarities in order to create an electromagnetic field. Eddy currents are generated in two rotors as they pass through this field, applying a braking torque to their rotation and therefore to the driveshafts attached to them. The stator houses the electromagnetic coils and is attached to the chassis, the transmission or an axle of the vehicle. Round discs called rotors are attached to the driveline. A thin air gap is maintained between the rotors and the coils. In normal operation, the rotor turns freely but when electric current flows through the coils, eddy currents are created that apply braking torque to the rotors and therefore to the driveline.

A frictionless braking system acts as a completely independent back-up braking system, and remains operative whatever the temperature. And because the mechanism is frictionless, brake fade is practically eliminated while the mechanism virtually never wears out. Stop-and-go driving can quietly destroy a vehicle's friction brakes, causing it to overshoot a busy intersection. By performing most of the vehicle deceleration before the foundation brakes are even applied, the frictionless braking system increases the safe stopping ability of the vehicle, and extends the life of the traditional brakes.

Conventional electromagnetic retarders may be used to reduce the speed of a motor vehicle. For instance, US Patent Application Publication No. 2007/0295568, whose contents are incorporated herein by reference, provides guidance.

In general terms, an electromagnetic retarder assists the braking of a vehicle in order to make it safer and more enduring. An electromagnetic retarder comprises at least one stator and at least one rotor. The stator is connected to a gearbox casing or to a transmission axle casing of a vehicle. In this case, a transmission shaft is not cut in order to mount the retarder. When the transmission shaft is not cut, a "Focal" (registered trade mark) retarder is spoken of. In a variant, the stator is fixed to the vehicle chassis and the transmission shaft is cut.

The rotor, for its part, is connected to a plate coupled to a flange of a universal joint of the transmission shaft. This plate is coupled to an input shaft of the vehicle axle or to an output shaft of the gearbox or to a connecting shaft. This connecting shaft can be connected to another plate when the transmission shaft is cut. In one example, the rotor is in two parts and is situated on each side of a stator and turns about the axis of the stator.

In an embodiment described in the document FR-A-2577357, the stator of the electromagnetic retarder carries a ring of coils, and generates a magnetic field. More precisely, each coil is mounted on a core made from magnetic material fixed to the stator. When it carries the coils, the stator is inductive. In the document FR-A-2577357, the rotor is produced from a magnetic material and is induced. This rotor is conformed so as to have fins that provide ventilation of the retarder. In another embodiment described in the document EP-A-0331559, the rotor carries the ring of coils and the cores. In this embodiment, the rotor is inducing and the stator is induced. This stator also carries a chamber inside which a fluid flows for its cooling. Such a retarder is said to be a water-cooled retarder or a Hydral retarder (registered trade mark).

The creation of a braking torque generated by an electromagnetic retarder is based on a principle of eddy currents. This is because the induced stator, inside which an inducing rotor turns, is subjected to an electromagnetic field. This field is generated by the coils mounted on the rotor which preferably function in pairs, each coil being wound around a projecting core belonging to the rotor. Each of the pairs of coils forms a magnetic field that closes from one core of the coil to another passing through the stator and through the rotor.

Thus, when the rotor starts to rotate, currents known as eddy currents arise inside the induced stator. These currents generate a braking torque that have a tendency to oppose the movement of the rotor. As the rotor turns with a drive shaft, this braking torque also opposes the movement of the drive shaft of the vehicle. This torque therefore participates in a slowing down or stoppage of the vehicle.

For a retarder comprising an inducing rotor, the eddy currents give rise to heating of the stator and rotor. This is because the currents passing through the stator and the coils produced from conductive materials have a tendency to heat the walls of the stator and the whole of the rotor. This heating phenomenon is referred to as Joule effect and is generally observable when an electric current passes through an electrical conductor. The power of an electromagnetic retarder is therefore limited by its capacity to discharge heat from the stator and coils.

Thus, in one example, the stator of a retarder dissipates a power of 300 kW and the coils of a retarder dissipate a not insignificant power of 8 kW. It is necessary to discharge heat associated with these powers in order to avoid a drop in performance and prevent any malfunctioning of the retarder.

Various systems are known for discharging this heat. For example, it is possible to use a fan integral with the rotor as described in the document EP-A-0331559. This generator generates a current of air in order to discharge heat dissipated by the rotor.

EP-A-0331559 also describes a solution in which the wall of the stator carries a cooling chamber allowing a circulation of a cooling fluid. An exchange of heat can then occur between the cold liquid of the cooling chamber and the hot walls of the stator. The heat from the wall of the stator can thus be discharged from the cooling liquid.

However, this cooling chamber system and the ventilation system have limits. This is because the cooling chambers make it possible to cool the stator effectively but, as they are distant from the coils, they do not cool them as effectively as desired.

As for the fans, they may generate a noise that is an audible nuisance very disagreeable for the driver. Moreover, fans can also be very bulky and increase the weight of the retarder. Being both bulky and heavy, these fans reduce the adaptability of the retarder for a given gearbox or rear axle. These fans are integral with the shaft or rotor but the path of the air flow that it generates is random, difficult and not optimised.

In addition, these fans consume a great deal of energy.

The over-consumption of the retarder can be explained by the fact that a variation in pressure of a fluid in a given environment gives rise to a circulation of particles in this environment. Thus, for a given variation in pressure, there exist several possible flow rates of fluid. This flow rate is determined by a path of the fluid and the difficulty that this fluid has had in circulating in the environment.

US Patent Application Publication No. 2007/0295568 seeks to resolve these problems of the circulation of air through the retarder, the size of the external fan and the audible nuisance generated by this fan.

To this end, an electromagnetic retarder is used that comprises perforations or apertures on its contour in order to facilitate the passage of a current of air. More precisely, the retarder according to the invention comprises inlet apertures and discharge apertures produced in walls of the retarder in order to facilitate circulation of a current of air. A current of air can in fact enter through an inlet aperture produced in general in a radial wall of the retarder or inclined with respect to the rotor shaft and leave the retarder through a discharge aperture produced either in a radial wall or in an inclined wall, or in a wall parallel to the axis of the retarder. Naturally the retarder can comprise several inlet apertures and several outlet apertures in order to provide an entry and discharge of intense air currents.

Thus it is possible to reduce the heat exchange surface and therefore the bulk and size of the retarder, whilst keeping its performance. In a variant, the size of the retarder can be kept and its performance increased. The retarder can function in an environment at a higher temperature. It is possible to install the retarder in particular by means of a speed multiplier acting on the shaft of the retarder rotor, in the space available, in particular adjacent to the vehicle engine or any other source of heat. The weight of the retarder can be reduced and the noise generated by the circulation of an air current is decreased.

In general, the circulation of air currents in order to cool the retarder is not used alone but in combination with means of cooling by cooling liquid consisting of cooling chambers. The purpose of this combination is to optimise to a maximum the cooling of the retarder both at the core of the stator and at the core of the coils. By virtue of mixed cooling, it is possible to reduce further the size and weight of the retarder whilst having the desired performance. In a variant, the performance of the retarder is increased. A discharge aperture is produced between two independent cooling chambers filled with a cooling fluid. It is also possible to produce a discharge aperture through two water chambers separated from each other by a throttling throat. In one embodiment, the discharge apertures belong to the same chamber. In a variant, the inlet and discharge apertures can be offset with respect to the cooling chambers.

To create a current of air, the retarder comprises one or more blades attached to, that is to say integral with, a rotating element of the retarder. The blades in one embodiment belong to a fan attached to the rotating element. For example, the blades are fixed to a plate or profiled base attached, for example by welding, riveting, or screwing, to the rotating element concerned. In a variant, the blades are attached individually to the rotating element or issue therefrom.

Thus it is possible to attach, that is to say to fix, blades either to a rotor of the retarder or to a rotor of a generator, or to the shaft itself of the retarder. As the rotation of blades is provided by elements of the retarder in operation in a rotary movement, these blades do not consume any energy other than that related to the stirring of the air. This is because these blades profit from the rotation of a rotating part of the retarder. The blades therefore belong to an internal fan with a small diameter, that is to say with a smaller diameter than a fan external to the casing of the retarder.

In one example, these blades consume much less energy than blades of a fan external to the casing that have a greater diameter and therefore mechanical losses and that consume an enormous amount of electrical energy supplied by the retarder. In addition, the blades attached to the rotor of the retarder or to that of a generator make very little noise compared with the use of an external fan. The external fan is in fact very noisy and consumes a great deal of power because of the constraints that it must comply with and in particular because of its large diameter, which allows the passage of a current of air through the retarder with great pressure drops.

Various types of blade can be used for providing the creation of a current of air. Each type of blade imparts a particular path to the current of air. It is possible first of all to use blades of the centrifugal type that provide a suction of a current of air parallel to an axis of a shaft of a rotor and a discharge of this current of air perpendicular to the axis of the shaft. It is also possible to use blades of the helico-centrifugal type that provide suction of a current of air parallel to the axis of the shaft and discharge of this current of air along a path inclined with respect to this axis. Finally, it is possible to use blades of the axial type that provide suction of a current of air parallel to the shaft and discharge also parallel to the shaft.

In practice, a retarder can comprise a combination of several types of blade. A retarder according to the invention can also comprise several blades of one and the same type. The inlet and outlet apertures are produced according to the blades used and the path of the current of air. The purpose of these blades is to make the current of air come into contact with the coils in order to cool these coils. Thus blades of the helico-centrifugal type can, for a given retarder, create a current of air that flows over an accessible part of a coil, such as its head, as closely as possible.

Moreover, in order to create a certain current of air, it is possible to envisage the use of blades having different defined functions. For example, first blades can fulfill a role of suction blades, taking air from an external environment. These first blades transmit this air to second blades, which discharge them to the external environment. These combinations of blades make it possible to increase and adjust a flow of air inside the retarder. In a variant, third blades are situated outside the retarder.

In a retarder, currents of air comprising the same direction of suction can be generated by blades. Thus, in a particular embodiment, a retarder comprises blades that make a current of air enter through one end of the retarder and discharge it through another end. Thus a current of air passes through the retarder in the direction of its length in order to cool it. In a variant, the blades suck air through one end of the retarder and discharge this air at the centre.

In a variant, it is possible to use blades that provide the creation of currents of air having directions of suction different from each other. In this variant, the currents of air enter inside the retarder through the two ends of the shaft. When next these currents of air are discharged approximately at the centre of the retarder in order to cool all the rotors of the retarder. In this variant, the flow rate of the air inside the retarder is very great around rotors situated at the centre of the retarder, in a zone where the two currents of air meet. This very high flow rate cools the coils and the rotors at the centre of the retarder, which have a tendency to heat up greatly.

The bases of some blades and some rotors may have a hole, channel or opening in them. These openings are produced so as to allow the passage of air from one rotor to another and ensure uniform cooling of the retarder. In addition, these openings allow cooling of the rotor and its coils by conduction. This is because the air comes into contact with the rotor inside the opening. As the rotor is produced from conductive material, this air has a tendency to cool the base of the rotor and then cool its centre, and then the coils. In a variant, these openings or channels are pierced in the rotor of the generator or in the rotor of the retarder. The retarder is may be configured so as to have a shaft and a rotor turning at a greater speed than the shaft transmitting movement to at least one wheel of the vehicle, this transmission shaft being for example the shaft acting between the rear axle and the gearbox. The increase in speed can be achieved for example by means of a speed multiplier. Thus it is possible to reduce the size and weight of the retarder whilst having the required performance.

c. Regenerative Braking

Vehicles driven by electric motors use the motor as a generator when using regenerative braking: it is operated as a generator during braking and its output is supplied to an electrical load; the transfer of energy to the load provides the braking effect.

Regenerative braking is used on hybrid gas/electric automobiles to recoup some of the energy lost during stopping. This energy is saved in a storage battery and used later to power the motor whenever the car is in electric mode.

An Energy Regeneration Brake was developed in 1967 for the AMC Amitron. This was a completely battery powered urban concept car whose batteries were recharged by regenerative braking, thus increasing the range of the automobile.

Many modern hybrid and electric vehicles use this technique to extend the range of the battery pack. Examples include the Toyota Prius, Honda Insight, the Vectrix electric maxi-scooter, the Tesla Roadster, the Nissan Leaf, and the Chevrolet Volt.

Traditional friction-based braking is used in conjunction with mechanical regenerative braking for the following reasons:

The regenerative braking effect drops off at lower speeds; therefore the friction brake is still required in order to bring the vehicle to a complete halt. Physical locking of the rotor is also required to prevent vehicles from rolling down hills.

The friction brake is a necessary back-up in the event of failure of the regenerative brake.

Most road vehicles with regenerative braking only have power on some wheels (as in a two-wheel drive car) and regenerative braking power only applies to such wheels because they are the only wheels linked to the drive motor, so in order to provide controlled braking under difficult conditions (such as in wet roads) friction based braking is necessary on the other wheels.

The amount of electrical energy capable of dissipation is limited by either the capacity of the supply system to absorb this energy or on the state of charge of the battery or capacitors. Regenerative braking can only occur if no other electrical component on the same supply system is drawing power and only if the battery or capacitors are not fully charged. For this reason, it is normal to also incorporate dynamic braking to absorb the excess energy.

Under emergency braking it is desirable that the braking force exerted be the maximum allowed by the friction between the wheels and the surface without slipping, over the entire speed range from the vehicle's maximum speed down to zero. The maximum force available for acceleration is typically much less than this except in the case of extreme high-performance vehicles. Therefore, the power required to be dissipated by the braking system under emergency braking conditions may be many times the maximum power, which is delivered under acceleration. Traction motors sized to handle the drive power may not be able to cope with the extra load and the battery may not be able to accept charge at a sufficiently high rate. Friction braking is required to dissipate the surplus energy in order to allow an acceptable emergency braking performance.

For these reasons there is typically the need to control the regenerative braking and match the friction and regenerative braking to produce the desired total braking output.

d. Wheel/Hub Motors

Volvo has an electric car recharge concept hybrid in-wheel motor EV that has 4 wheel motors each rated for 100,000 hours or 6 million Kms before they need servicing. According to Volvo, only about 15% of the energy from the fuel put in the tank gets used to move the car down the road or run useful accessories, such as air conditioning. The rest of the energy is lost to engine and drive line inefficiencies and idling. With an Electric Car it costs just $2.00 per 100 kms with MUCH more performance than with petrol at $20.00 per 100 kms.

There is no transmission shaft between the engine and the wheels. A generator recharges the batteries and powers the wheel motors when the battery power is low. Each wheel motor acts as a separate generator during braking, sending power back to the battery.

Hub motor electromagnetic fields are supplied to the stationary windings of the motor. The outer part of the motor follows, or tries to follow, those fields, turning the attached wheel. In a brushed motor, energy is transferred by brushes contacting the rotating shaft of the motor. Energy is transferred in a brushless motor electronically, eliminating physical contact between stationary and moving parts. Although brushless motor technology is more expensive, most are more efficient and longer-lasting than brushed motor systems.

Electric motors have their greatest torque at startup, making them ideal for vehicles as they need the most torque at startup too. The idea of "revving up" so common with internal combustion engines is unnecessary with electric motors. Their greatest torque occurs as the rotor first begins to turn, which is why electric motors do not require a transmission. A gear-down arrangement may be needed, but unlike in a transmission normally paired with a combustion engine, no shifting is needed for electric motors.

Cars with electronic control of brakes and acceleration provide more opportunities for computerized vehicle dynamics such as:

Active cruise control, where the vehicle can maintain a given distance from a vehicle ahead Collision avoidance, where the vehicle can automatically brake to avoid a collision Emergency brake assist, where the vehicle senses an emergency stop and applies maximum braking Active software differentials, where individual wheel speed is adjusted in response to other inputs Active brake bias, where individual wheel brake effort is adjusted in real time to maintain vehicle stability Brake steer, where individual wheel brake bias is adjusted to assist steering (similar to a tracked vehicle like a Bulldozer)

A disadvantage of Wheel hub motors is that the weight of the electric motors increase the unsprung weight, which adversely affects handling and ride (the wheels are more sluggish in responding to road conditions, especially fast motions over bumps, and transmit the bumps to the chassis instead of absorbing them). Most conventional electric motors include ferrous material composed of laminated electrical steel. This ferrous material contributes most of the weight of electric motors. To minimize this weight, several recent wheel motor designs have minimized the electrical steel content of the motor by utilizing a coreless design with Litz wire coil windings to reduce eddy current losses. This significantly reduces wheel motor weight and therefore unsprung weight.

Eliminating mechanical transmission including gearboxes, differentials, drive shafts and axles provides a significant weight and manufacturing cost saving, while also decreasing the environmental impact.

ABS manages to balance the braking effort so balancing the load on four Electric Motors is feasible with modern control systems. Such modern control systems may switch to two wheel drive to give good control whilst you bring the vehicle to a halt in the case of failure of one hub motor.

The Michelin tire company promotes an "Active Wheel" system that contains virtually all of the components necessary for a vehicle to propel or stop: an electric motor, suspension coils and springs, and braking components. The only thing missing is the source of energy.

Fed by lithium ion batteries or fuel cells, the Active Wheel's electric motor will output 30 kilowatts of power—per wheel that is. Vehicles using this system can be configured with two Active Wheels up front, or one at each corner. This allows manufacturers to offer both two- and four-wheel drive setups.

The Active Wheel is essentially a standard wheel that houses a pair of electric motors. One of the motors spins the wheel and transmits power to the ground, while the other acts as an active suspension system to improve comfort, handling and stability. The system is designed for battery or fuel-cell powered electric vehicles, and the technology is such that a vehicle equipped with it will no longer need any gearbox, clutch, transmission shaft, universal joint or anti-roll bar.

Active Wheel's compact drive motor and integrated suspension system has also enabled designers to fit a standard brake disc between the motors, which means the braking, drive and suspension components are all fitted within the single wheel.

Depending on the amount of power or type of usage desired, a given vehicle may feature up to four Active Wheels for AWD traction. The system also allows torque from the motors to be electronically controlled for each individual wheel independently. The results are similar to the effects of an active differential, allowing a vehicle with Active Wheel technology to make much faster turns in poor conditions than traditional shaft-driven vehicles.

For the suspension, an electric motor controls an actuator connected to a damping system with varying levels of firmness. This unique system features extremely fast response time—just $3/1000$ths of a second and all pitching and rolling motions are automatically corrected. Since there is no need for a traditional engine in the front of the vehicle, this area can now be entirely dedicated to impact absorption.

The dynamo (with a small wheel) is attached to the actual wheel of the bicycle. When we pedal the bicycle, the wheel of the dynamo rotates along with the actual wheel of the bicycle and generates enough power to operate the front light. Actually, this is even used in motor bikes to power the head-lamp.

e. Converting Kinetic Rotary Wheel Motion into Electricity Generation

There have been conventional inquiries as to whether car wheels could be fitted with windings and magnets to make them generate electricity as they turn. The car would be a gas/electric hybrid. The batteries would be charged any time the vehicle was in motion.

It is desired to fit car wheels with components that convert the rotary motion of the car wheels into electricity generation when driving and to slow or stop the rotary motion of the car wheels when braking and that suck in wind to rotate a turbine generator to generate electricity.

SUMMARY OF THE INVENTION

One aspect of the invention resides in a motor driven vehicle wheel equipped with a rotor and a stator that cooperate with each other to generate electricity in response to rotation of the vehicle wheel and that generate eddy currents to slow or stop rotation of vehicle wheel in response to braking. The wheels may also be equipped with means for sucking in wind to drive a turbine generator to generate electricity.

Preferably, the vehicle wheel is also equipped with conventional regenerative braking to recoup some of the energy lost during stopping by saving the energy in a storage battery or set of storage batteries to be used later to power the motor whenever the car is in electric mode. The electricity generated in response to rotation of the vehicle wheel when driving (without braking) is likewise stored in the same storage battery or set of storage batteries. For instance, the front wheels could be equipped with regenerative braking while the rear wheels could be equipped with electric retarders.

Another aspect resides in sucking in wind through the wheels to a wind turbine that generates electricity in response to air current flow entering the wind turbine as the motor driven vehicle is being driven. The electricity generated in response to the motor driven vehicle being driven is likewise stored in the same storage battery or set of storage batteries.

BRIEF DESCRIPTION OF THE DRAWING

For a better understanding of the present invention, reference is made to the following description and accompanying drawings, while the scope of the invention is set forth in the appended claims.

DESCRIPTION OF THE PREFERRED EMBODIMENT

Figure 1:
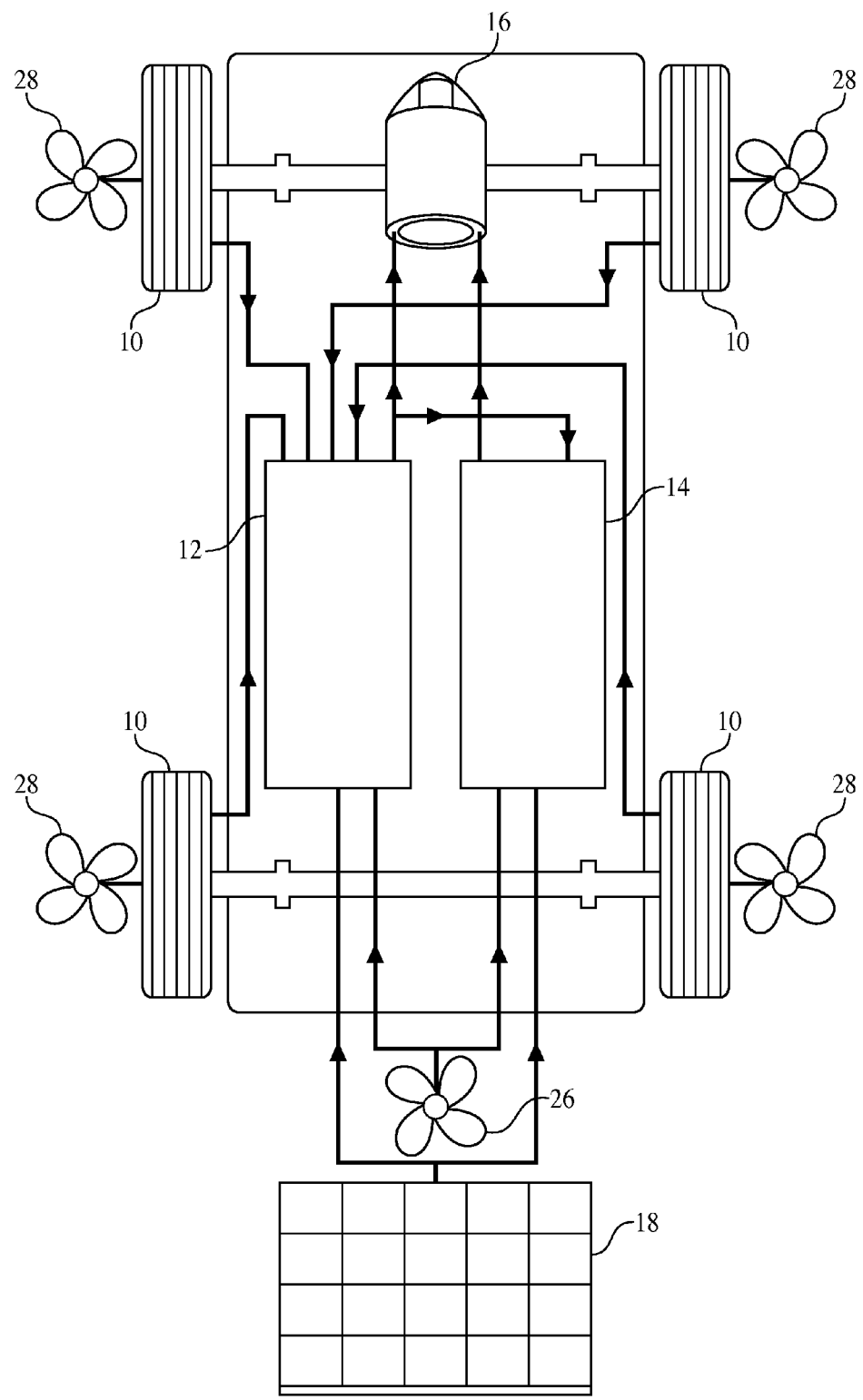
FIG. 1 is a schematic diagram of a motor vehicle drive system equipped with electricity generators, wind turbine generators, solar panels, batteries, and motors in accordance with a single motor drive embodiment of the invention.
Figure 2:
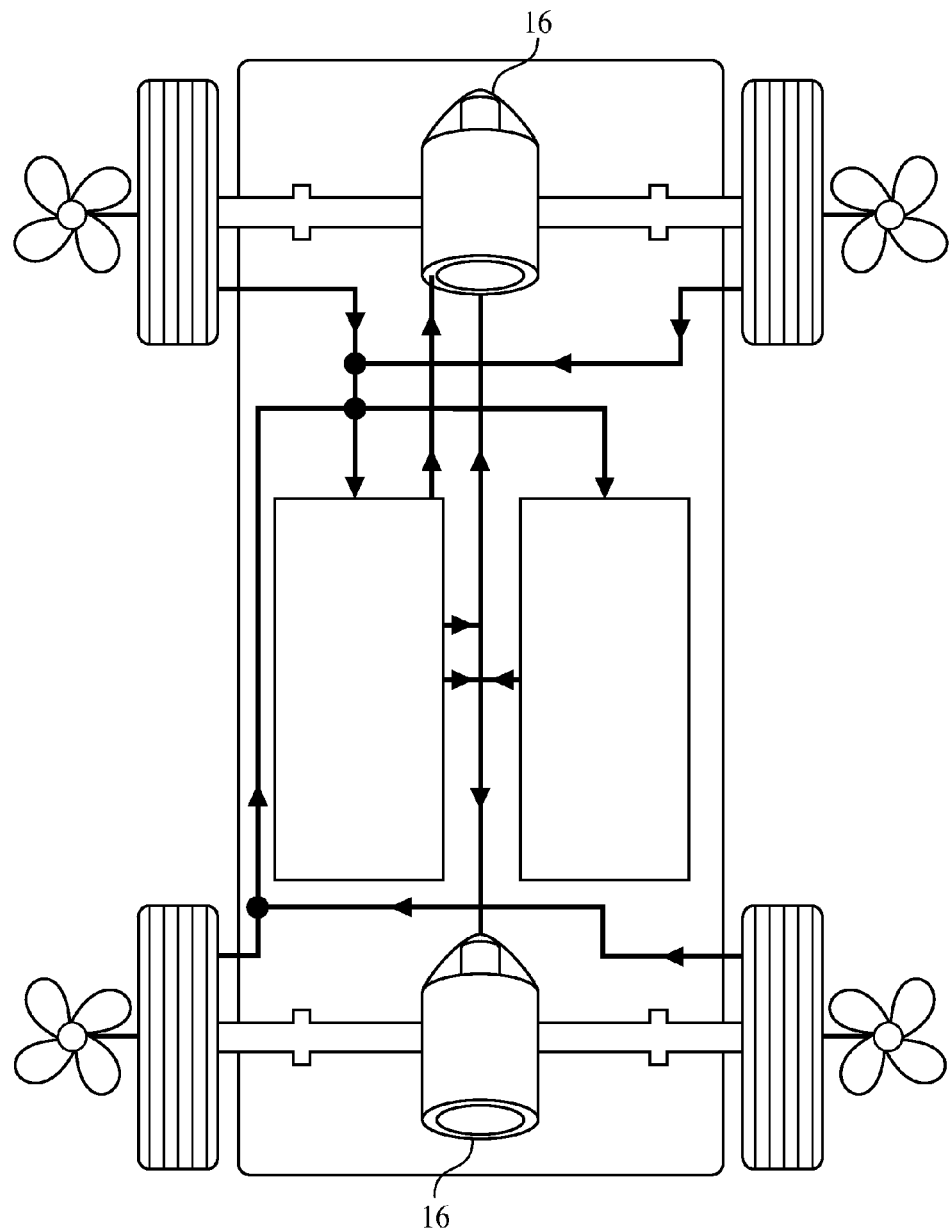
FIG. 2 is a schematic diagram of a motor vehicle drive system equipped with electricity generators, batteries, and motors in accordance with a dual motor drive embodiment of the invention.
Figure 3:
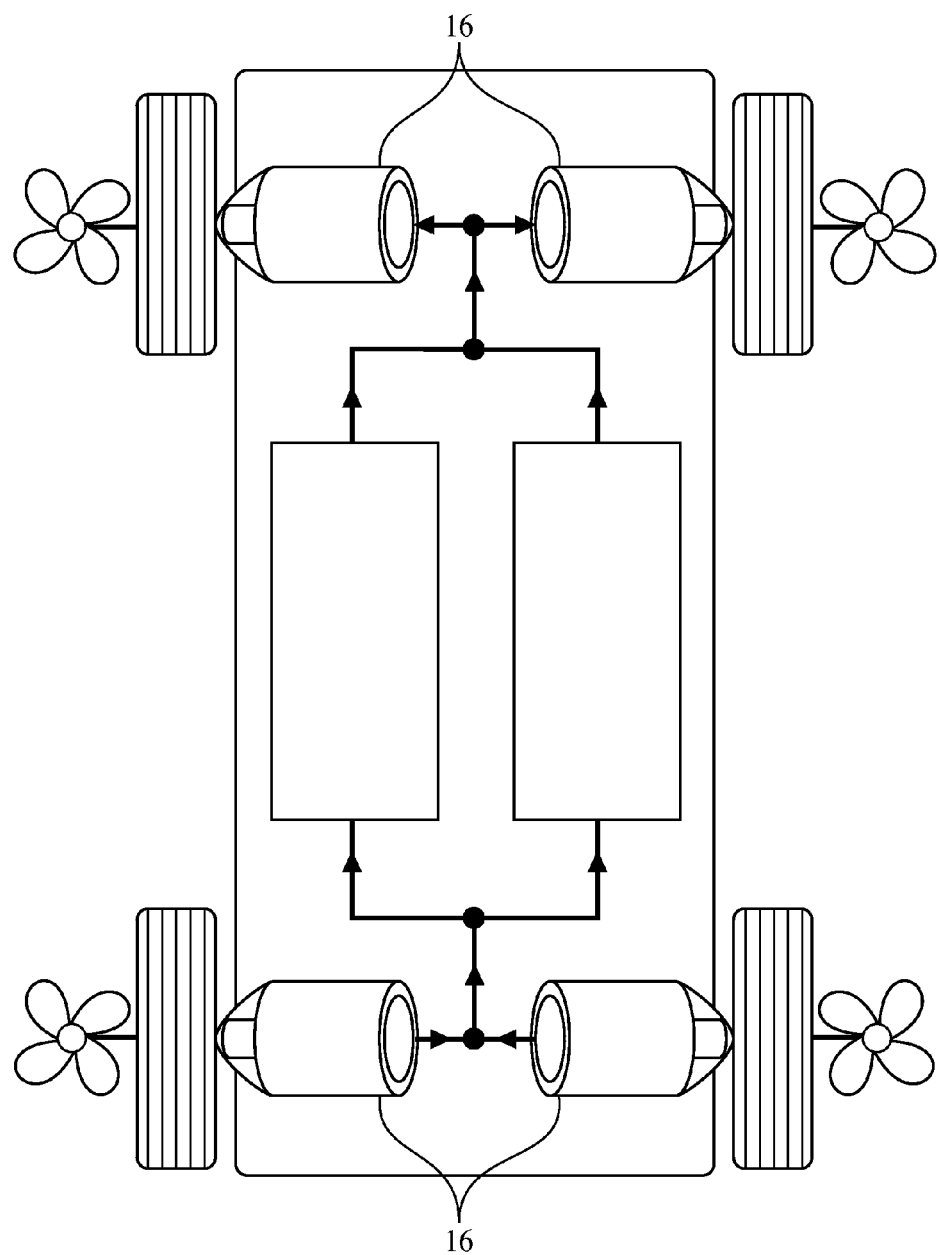
FIG. 3 is a schematic diagram of a four-motor (one for each wheel) motor vehicle drive system equipped with electricity generators, batteries, and motors in accordance with a four motor drive embodiment of the invention.

Turning to the drawing, FIGS. 1-3 show schematically respective drive systems of motor vehicle. FIG. 1 shows a single motor drive system. FIG. 2 shows a dual motor drive system. FIG. 3 shows a four motor drive system with each motor in a respective wheel.

FIGS. 1-3 have the following components in common: four wheels 10, two storage batteries 12, 14 and at least one motor 16 powered by the batteries 12, 14. While FIGS. 1-3 shows a wind suction fan 28 at each wheel that directs air flow to a turbine generator 26 and FIG. 1 shows a roof mounted solar panel electricity generator 18. The roof mounted solar panel electricity generator 18 and the turbine generator 26 may be provided in the same manner for the embodiments of FIGS. 2 and 3.

As shown in FIGS. 1-4, each wheel is equipped with induction means 20 for creating a magnetic field in proximity of conductive elements. The relative arrangement may be either that the magnetic field turns within conductive elements or the conductive elements turn within the magnetic field. However, the rotary wheel hub has conductive rotor elements 22 that spin about a stator 40. The stator 40 may be equipped with permanent magnets and/or electromagnets.

The batteries 12, 14 receive an synergy energy boost when charged by electricity generation from a generator using the induction means 20 to convert kinetic motion of the vehicle wheel into electricity as the vehicle wheel 10 rotates and from a wind turbine generator. The batteries 12, 14 also receive the synergy energy boost when charged by the electricity from the wind turbine generator 26 (FIG. 4) or the solar panel electricity generator 18 (FIGS. 1 and 4).

The induction means 20 is operative in two modes of operation. The first is to recover kinetic energy from tire rotation as the motor vehicle moves and convert the recovered energy into electricity. The second is to slow the vehicle by service as electromagnetic retarders. The first mode of operation arises when no brake is actuated and the second mode of operation arises when the brake is actuated to slow the vehicle.

Figure 4:
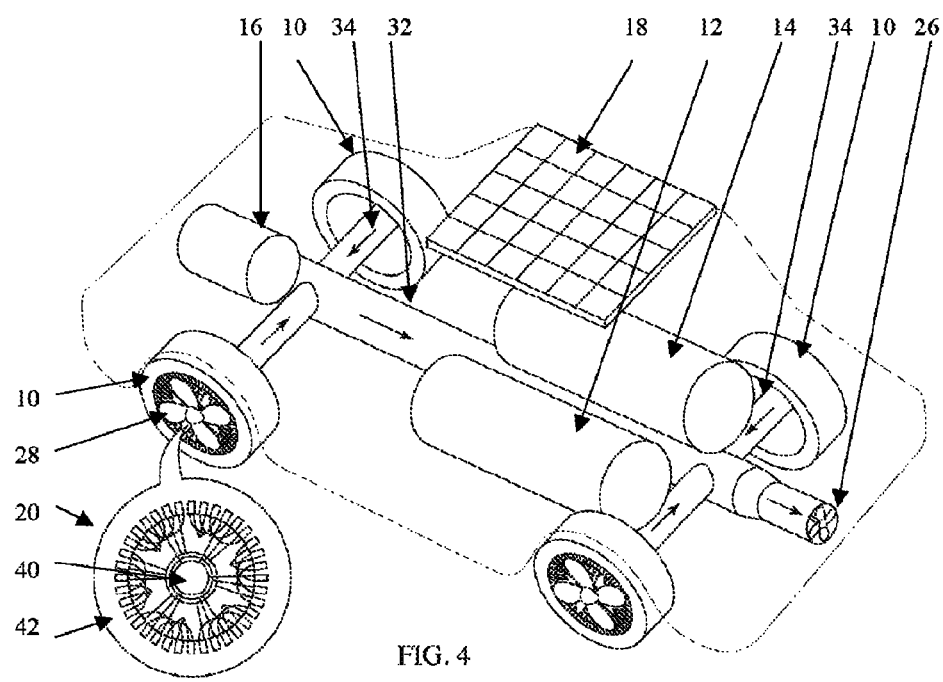
FIG. 4 is an isometric schematic diagram of a motor vehicle showing its drive system and an energy recovery system in accordance with the invention (including energy recovery of motor vehicle kinetic energy, wind flow energy, and solar radiation energy) and depicting an enlargement of a motor vehicle wheel equipped with a rotor and stator for effecting energy recovery and electric retarder capability.

Turning to FIG. 4, the energy recovery systems are indicated. The kinetic energy recovery system includes induction means 20, which recovers kinetic energy from tire rotation when motor vehicle brakes are not be actuated. When the brakes are actuated, however, then the induction means 20 provides electromagnetic retarder "frictionless braking". In a sense, the actuation of the brakes acts as a switch means alternate between modes of operation depending upon whether or not the brakes are actuated.

The induction means 20 includes a stator 40 and a rotor 42. The stator 40 remains stationary while the rotor 42 rotates with rotation of the wheel. In a conventional manner, the stator 40 and rotor 42 are wired to create electromagnetic induction. Unlike regenerative braking that generates electricity as friction brakes are applied, the kinetic energy recovery system operates to recovery energy from wheel rotation as the wheels rotate unencumbered by braking and a generator converts the recovered energy through induction into electricity.

The wind energy recovery system includes the turbine generator 26, wheel fans 28 and an air duct 30. The air duct 30 includes a main duct 32 that may be placed in the space otherwise reserved for a drive shaft extending between the front and rear wheel shafts since the drive shaft of conventional motor vehicles is no longer needed.

Air duct branches 34 from each of the wheels communicate with the main duct 32. Each of the wheel fans 28 have blades that rotate in unison with rotation of the vehicle wheel 10 to suck air through associated air duct branches 34 to reach the main duct 32. At the rear of the main duct 32 is the turbine generator 26 to which the air flow from the wheel fans eventually reach.

The roof mounted solar panel electricity generator 18 is conventional, but serves to generate electricity from insolation, i.e., from solar radiation.

Figure 5:
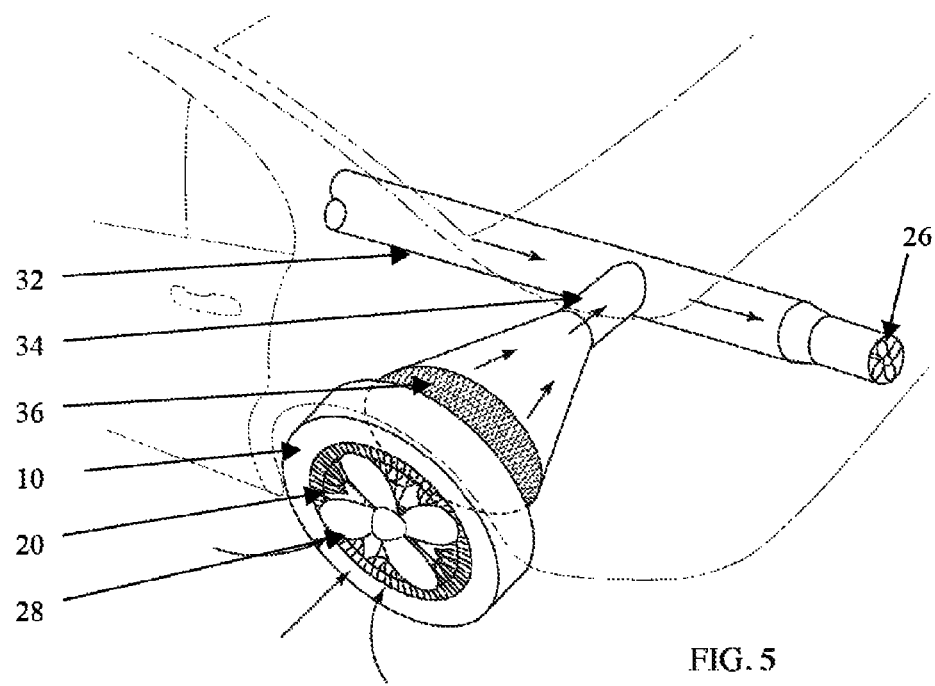
FIG. 5 is an isometric schematic diagram of a portion of the motor vehicle with respect to a rear wheel and wind flow system in accordance with the invention.

Turning to FIG. 5, the wheel fan 28 is located centrally within the wheel. The induction means 20 of the stator and rotator is in each wheel. The wheel fan 28 sucks in air during tire rotation as indicated by the flow arrows. This suction forces the air through a mesh screen 36 to enter an air duct branch 34 through which the air is urged to reach the main duct 32 where the air combines with air sucked in through other wheels to turn blades of the turbine generator 26, which generates electricity. The mesh screen 36 prevents debris from the roadway, such as rocks, stones, snow, etc. from entering and thereby clogging the air duct branch 34 or the main duct 32. Drains may be provided to allow any accumulation of water to drain out of the ducts.

Each of the air duct branches 34 may be shaped to converge to the main duct 32 to that the sucked-in air flow from the wheel fans 28 pressurizes further during passage through the converging shape of an associated one of the air duct branches 34 to reach the main duct 32. The main duct 32 may likewise converge in a direction toward the turbine generator 26.

One of the obstacles to the use of retardant braking in motor vehicles instead of friction braking concerns the use of brakes during parking maneuvers. The present invention solves this issue if regenerative braking is provided (or some other emergency friction brake is provided) for at least two of the wheels and the retardant braking is used for the remaining two. The rate of speed of the vehicle may be monitored by a controller to govern whether regenerative braking (or emergency friction braking) should be used or whether retardant braking should be used. At relatively high speeds, retardant braking should be used to the exclusion of friction braking so as to avoid wear of the friction braking, except if there is a failure with the retardant braking. Thus, the status of retardant braking needs to be monitored as well by a controller, which would send signals quickly to initiate friction braking (whether regenerative or emergency friction braking) if sensors detect a failure with the retardant braking. At slow speeds, the friction braking would be active. Thus, a controller is provided that receives sensor inputs from sensors monitoring the vehicle speed and from the effectiveness of the retardant braking to direct the activation of friction braking if warranted. Further, sensors may detect the proximity of vehicles in front (or fixed obstacles) to calculate whether retardant braking alone will suffice to stop the vehicle in time or whether additional braking from friction braking should be applied as well and to send instructions accordingly to initiate the friction braking (whether regenerative or emergency friction braking) if warranted.

While the foregoing description and drawings represent the preferred embodiments of the present invention, it will be understood that various changes and modifications may be made without departing from the scope of the present invention.

What is claimed is:

1. A self rechargeable synergy drive apparatus, comprising a plurality of vehicle wheels each having a tire, each of the vehicle wheels being equipped with recovery means for providing a synergy energy boost to a power supply by recovering energy that arises in response to rotation of associated ones of the vehicle wheels that move the vehicle and for converting the recovered energy into electricity to provide the synergy energy boost, said recovery means being selected from a group consisting of means for recovering kinetic energy from rotation of associated ones of the vehicle wheels and means for recovering wind energy from airflow passing through associated ones of the vehicle wheels each equipped with respective fan blades that turn in unison with respective vehicle wheel rotation to suck air through the vehicle wheels to create the airflow; and ductwork arranged to guide the airflow from the vehicle wheels accordingly to reach a turbine generator, the ductwork including a main duct and branch ducts, the branch ducts being in communication with the main duct and each of the branch ducts being associated with a respective one of the vehicle wheels, the ductwork guiding the airflow to pass from each of the vehicle wheels through associated ones of the branch ducts to reach the main duct and thereafter reach the turbine generator.

2. The apparatus of claim 1, wherein said recovery means include conductive elements within confines of at least one of the vehicle wheels and induction means for generating a magnetic field in proximity of the conductive elements during the rotation of the at least one of the vehicle wheels, said recovery means further including the at least one of the vehicle wheels being equipped with conversion means for converting kinetic energy recovered from rotation of the at least one of the vehicle wheels into electricity to provide the synergy energy boost to a vehicle power supply, retardant means for slowing rotation of the at least one of the vehicle wheels, said retardant means slowing the rotation of the at least one of the vehicle wheels via said induction means in response to said retardant means undergoing activation and said conversion means carrying out the converting via the induction means in response to said conversion means undergoing activation; switch means for selectively deactivating said conversion means and activating said retardant means and for selectively activating said conversion means and deactivating said retardant means; and cooling means for cooling the conductive elements with airflow passing through the at least one vehicle wheel, said cooling means including blades of a fan that rotate in unison with rotation of the vehicle wheel to suck in air and thereby create the airflow.

3. The apparatus of claim 2, wherein said switch means is responsive to actuation of a vehicle brake to deactivate said conversion means in favor of activating said retardant means, said switch means being responsive to release from actuation of the vehicle brake to actuate said conversion means.

4. The apparatus of claim 2, wherein said induction means effects electromagnetic induction.

5. The apparatus of claim 2, wherein the power supply being selected from a group consisting of a battery, a capacitor and a power line.

6. The apparatus of claim 2, further comprising means for providing a further synergy energy boost to the power supply via a vehicle roof mounted means for converting insolation into electricity to charge the power supply and thereby provide the further synergy energy boost.

7. The apparatus of claim 2, wherein the wind turbine generator converts energy from the airflow through the at least one vehicle wheel into electricity to charge the power supply as the at least one of the vehicle wheels rotates.

8. The apparatus of claim 7, wherein the turbine generator includes air suction components and blade components, at least some of the components being arranged to rotate in unison with rotation of the at least one of the vehicle wheels.

9. The apparatus of claim 2, further comprising regenerative braking means for regenerative braking while converting energy from the regenerative braking into electricity to charge the power supply.

10. The apparatus of claim 9, further comprising sensors and a controller, the sensors sensing vehicle speed and effectiveness of the retardant means in slowing down the vehicle, the controller receiving inputs from the sensors to initiate the regenerative braking means to brake the vehicle if warranted based on the vehicle speed and the effectiveness of the retardant means in slowing down the vehicle.

11. The apparatus of claim 2, further comprising a mesh screen situated in a path that the air flow traverses through the ductwork between the fan blades and the turbine generator.

12. The apparatus of claim 11, further comprising means for providing a further synergy energy boost to the power supply via a vehicle roof mounted means for converting insolation into electricity to charge the power supply and thereby provide the further synergy energy boost.

13. A self rechargeable synergy drive apparatus, comprising a plurality of vehicle wheels each having a tire, each of the vehicle wheels being equipped with recovery means for providing a synergy energy boost to a power supply by recovering energy that arises in response to rotation of the vehicle wheel that moves the vehicle and for converting the recovered energy into electricity to provide the synergy energy boost, said recovery means being selected from a group consisting of means for recovering kinetic energy from rotation of associated ones of vehicle wheels and means for recovering wind energy from airflow passing through the associated ones of the vehicle wheels, conductive elements within confines of associated ones of the vehicle wheels; induction means for generating a magnetic field in proximity to the conductive elements as associated ones of the vehicle wheels rotate; said means for providing the energy boost to the power supply including conversion means for converting the kinetic energy from the rotation of associated ones of the vehicle wheels into electricity via the induction means to charge the power supply and thereby provide the synergy energy boost; retardant means for slowing rotation of the associated ones of the vehicle wheels via the induction means; switch means for selectively deactivating said conversion means and for activating said retardant means and for selectively activating said conversion means and for deactivating said retardant means; ductwork including a main duct and branch ducts, the branch ducts being in communication with the main duct and each of the branch ducts being associated with a respective one of the vehicle wheels, the ductwork guiding the airflow to pass from each of the vehicle wheels through associated ones of the branch ducts to reach the main duct and thereafter reach a turbine generator.

14. The apparatus of claim 13, wherein said switch means is responsive to actuation of a vehicle brake to deactivate said conversion means in favor of activating said retardant means, said switch means being responsive to release from actuation of the vehicle brake to actuate said conversion means.

* * * * *